Oct. 15, 1963  J. W. SCOTT  3,106,994
FASTENING APPARATUS
Filed March 7, 1960
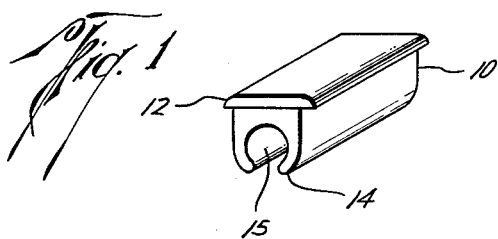
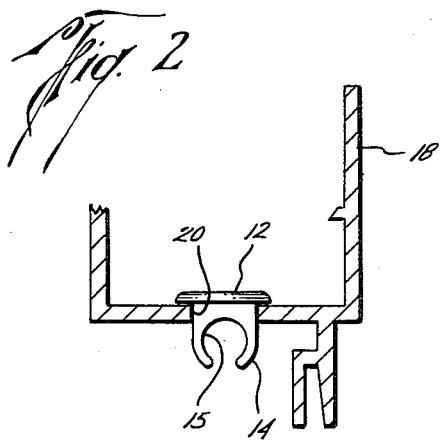
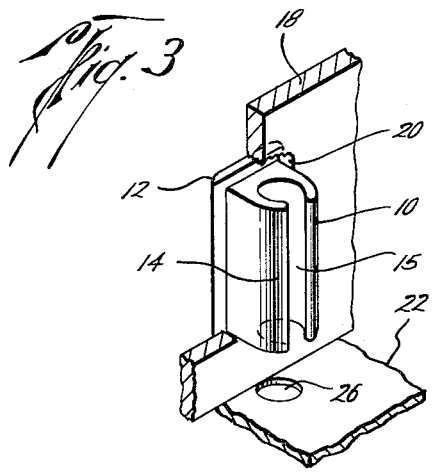
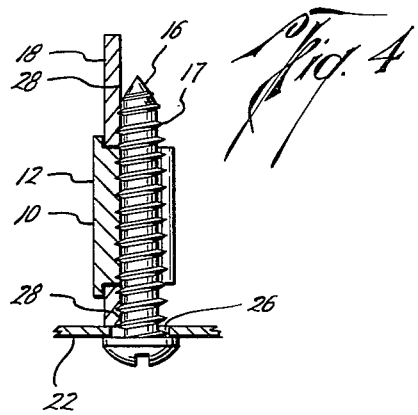
John W. Scott
INVENTOR.
BY James F. Weiler
Jefferson D. Giller
William P. Stout
ATTORNEYS

United States Patent Office 3,106,994
Patented Oct. 15, 1963

3,106,994
FASTENING APPARATUS
John W. Scott, Bryan, Tex., assignor to Albritton Engineering Corporation, Bryan, Tex., a corporation of Texas
Filed Mar. 7, 1960, Ser. No. 13,248
7 Claims. (Cl. 189—36)

The present invention relates to an improved fastening apparatus for connecting two members together and, more particularly, relates to an improvement in a fastening apparatus which secures two members or partitions together and yet provides a weatherproof connection.

While the present invention can be used to secure any two members together, it is particularly adapted to provide a watertight fastening apparatus suitable and necessary in the fabrication of metal products incuding metal windows and doors. In the past expensive full length extruded bosses as shown in the patent to Gwynne, No. 2,736,403 or a nut and bolt fastener such as shown in the patent to Grimes, No. 2,040,374 have been used. The present invention is directed to an improvement in partition fastening means by providing an inexpensive, and yet weatherproof fastening assembly.

It is therefore an object of the present invention to provide an improved fastening assembly which secures two members together and yet provides a watertight joint.

A further object of the present invention is the provision of an improved fastening apparatus utilizing a screw and insert means having a flange which seals the insert opening.

Yet a further object of the present invention is the provision of a joinery insert and screw assembly in which the joinery insert is wedged into place by its fastening screw thus providing a positive seal and thus a weatherproof joint.

Yet a further object is the provision of an improved fastening apparatus which is inexpensive, simple, easy to install and which has no weather openings.

Other and further objects, features and advantages will be apparent from the following description of a presently preferred embodiment of the invention, given for the purpose of disclosure and taken in conjunction with the accompanying drawing, where like character references designate like parts throughout the several views, and where FIGURE 1 is a perspective view of the joinery insert of the present invention, FIGURE 2 is a top elevational view of the joinery insert when inserted in a partial section of a window jamb, FIGURE 3 is a partial sectional perspective view of the joinery insert in place to secure two members together, and FIGURE 4 is a sectional view illustrating the fastening assembly of the present invention in position securing and holding two members together in a weathertight assembly.

Generally, the fastening apparatus of the present invention is directed to fastening two partitions or members together by the use of an insert which is positioned in an opening in one of the members and a screw which is inserted through a hole in the second member or partition and threadedly secured to the insert and wedging the insert in place ot seal the insert opening.

Referring now to the drawing, the reference numeral 10 generally designates the joinery insert which is positioned in an opening 20 of one of the members or partitions 18 which is to be fastened to another member or partition 22 by connection to a screw 16 (FIGURE 4). The joinery insert 10 includes a body 14 having a lineal passageway 15 which is sized to receive the threads 17 of the screw 16. The joinery insert 10 also includes a flange or stop 12 which is sized to cover the opening 20 so that when the insert 10 is positioned in the opening 20 the flange 12 will cover and seal the opening 20 as well as support the insert 10.

Referring to FIGURES 3 and 4, it is best seen that an opening 26 is provided in the second member or partition 22 and is aligned with the passageway 15 so that a screw 16 may be inserted through the opening 26 and threadedly secured in the passageway 15 to hold the partitions 18 and 22 together.

The passageway 15 may be threaded to receive the threads 17 on the screw 16 or a self tapping screw 16 may be used.

While the flange 12 covers the opening 20 and thus seals the opening to some extent when the screw 16 is threaded in place, it is preferable to position the circumference of the lonigtudinal passageway 15 which receives the screw 16 a distance from the internal shoulder of flange 12 equal to or slightly less than the thickness of the wall of the member 18. Thus, as best seen in FIGURE 4, when the screw 16 is threaded into the passageway 15 the threads 17 will bind and wedge against the interior wall 28 of the member 18 thereby wedging the insert 10 tightly against the perimeter of the opening 20 to insure a waterproof and weatherproof seal. If desired, a suitable gasket (not shown) may be placed between the flange 12 and the member 18; however, it has been found that the wedge fit of the flange 12 against the member 18 provides a sufficiently tight seal.

Obviously the shape of the insert could be circular, oval or square as well as rectangular as illustrated in the drawing, the insert could be made of any suitable material such as plastic or metal, the partitions could be joined at an angle other than perpendicular as shown and while it is preferable that the linear passageway 15 be parallel to the partition wall 18 in order to secure a maximum wedge action, the passageway 15 could be angularly disposed to the wall 18 and the wedge action achieved merely by the end of the screw 16 contacting the wall 28.

In use, an opening 20 is provided in one of the members 18 for the insertion of the body 14 of the insert 10 and an opening 26 is provided in the other partition 22 and aligned with the linear pasageway 15 of the insert 10. A joinery insert 10 is inserted into the opening 20 as illustrated in FIGURES 2 and 3, and is prevented from going completely through the opening 20 by the flange 12. The flange entirely covers the opening 20 when the insert 10 is positioned in the opening 20. A screw is inserted through the opening 26 in the second member 22 and threadedly secured into the passageway 15 of the insert 10. When the screw 16 is tightened the partition members 18 and 22 will be drawn tightly together as seen in FIGURE 4 and the flange 12 is drawn tightly to the wall 18 by the bite of the threads 17 on the interior wall 28 of the member 18 since the thickness of the body 14 between the passageway 15 and the flange or shoulder stop 12 is equal to or less than the thickness of the wall 18. The head of the screw 16 will also tightly wedge against the opening 26 and provide a weatherproof seal about that opening. Thus, the members 18 and 22 are securely fastened together and sealed with a waterproof and weatherproof joint.

The present invention, therefore, is well adapted to carry out the objects and attain the ends and advantages mentioned as well as other inherent therein. While a presently preferred embodiment of the invention is given for the purpose of disclosure, numerous changes in the details of construction and arrangement of parts may be made which will readily suggest themselves to those skilled in the art and which are encompassed within the spirit of the invention and the scope of the appended claims.

What is claimed is:

1. A fastening assembly comprising, first and second structural members inclined at an angle toward each other, each of said structural members having an opening, a joinery insert having a body sized to be inserted in the opening of the first member, said body having a passageway, said passageway being parallel to said first member, a screw positioned in the opening of the second member and in the passageway, the threads of the screw being circumferentially larger than the passageway, a flange connected to said body, and said flange entirely covering said opening of the first member when the body is inserted into said opening thereby providing a seal.

2. A fastening assembly comprising, first and second structural members, said first member including an insert opening, a joinery insert having a body sized to be inserted in the insert opening, said body having a passageway, a screw for connection to the second structural member and into the passageway, the threads of the screw being circumferentially larger than the interior of the passageway, a sealing flange connected to the body and sized to entirely cover the insert opening when the insert is positioned in said opening, said insert passageway being positioned in said body a distance from the flange no more than the thickness of the first member whereby when the fastening screw is inserted into the passageway the threads of the screw will wedge the flange against the first member in a sealing relationship.

3. A fastening assembly comprising, first and second structural members, said first structural member having an insert opening, said second structural member having a screw opening, a joinery insert sized to be inserted into the insert opening of the first member, said insert having a lineal passageway aligned with the screw opening of the second member for receiving a fastening screw, a sealing flange secured to the joinery insert and sized to entirely cover the insert opening of the first member when the insert is positioned in said opening, a fastening screw for connecting the second member to the joinery insert, said screw having threads of a circumferential diameter larger than the interior of the passageway, the width of the joinery insert between the passageway and the sealing flange being less than the wall thickness of the first member whereby when the fastening screw connects the second member to the first member by being threadably connected in the insert passageway the first and second members are fastened together and the sealing flange is wedged against and seals the insert opening.

4. In a fastening assembly for securing first and second members together at an angle to each other wherein the first member includes a joinery insert opening, the improvement in a joinery insert comprising, a body having a passageway for receiving securing means, said passageway being parallel to said first member when the insert is positioned in said insert opening, a sealing flange connected to said body, said flange entirely covering said opening when the body is inserted into said insert opening thereby providing a seal, and securing means securing the second member to the body.

5. In a fastening assembly for securing two structural members together with a screw and joinery insert, one of said members including an insert opening and the second member including a screw opening, the improvement in the joinery insert comprising, a body having a passageway for receiving the screw, the passageway interior being sized smaller than the exterior diameter of the threads on the screw, a sealing flange connected to the body and sized to entirely cover the insert opening when the insert is positioned in said insert opening, said insert passageway being positioned in the body a distance from the flange such that the screw threads will contact the first member when a fastening screw is inserted into the screw opening and into the body passageway, and thus, the threads of the screw will wedge the sealing flange about the insert opening.

6. In a fastening assembly for securing first and second structural members together with a fastening screw and a joinery insert, the first of said members including an insert opening and the second member including a screw opening, the improvement in a joinery insert comprising, a body sized for insertion into the insert opening of the first member and having a lineal passageway aligned with the screw opening of the second member for receiving the fastening screw, a sealing flange connected to the body and sized to entirely cover the insert opening of the first member when the body is positioned into the insert opening, said passageway being positioned from the sealing flange a distance no more than the thickness of the first structural member whereby when a fastening screw is secured through the second member opening and into the lineal passageway the first and second members are secured together and the sealing flange is wedged over and seals the insert opening of the first member.

7. In a fastening assembly for securing two structural members together at right angles with a screw and joinery insert, the first of said members including an insert opening and the second member including a screw opening, the improvement in the joinery insert comprising, a body having a passageway for receiving the screw, said passageway being parallel to said first member when the insert is positioned in said opening, said passageway being aligned with the screw opening of the second member for receiving a fastening screw when the insert is positioned in said insert opening, the passageway interior being sized smaller than the exterior diameter of the threads on the screw, a sealing flange connected to the body and sized to entirely cover the insert opening when the insert is positioned in said insert opening, said insert passageway being positioned in the body a distance from the flange such that the screw threads will contact the first member when the fastening screw is inserted in the screw opening and into the body passageway, and thus the threads of the screw will wedge the sealing flange about the insert opening.

References Cited in the file of this patent

UNITED STATES PATENTS

| | | |
|---|---|---|
| 2,040,374 | Grimes | May 12, 1936 |
| 2,883,228 | Roberts | Apr. 21, 1959 |
| 2,956,605 | Rapata | Oct. 18, 1960 |